US008641294B2

(12) United States Patent
Bannister

(10) Patent No.: US 8,641,294 B2
(45) Date of Patent: Feb. 4, 2014

(54) INTERFACE ASSEMBLY, CONSOLIDATION TOOLING AND METHOD OF MOUNTING AN INTERFACE ASSEMBLY TO A SUBSTRATE

(76) Inventor: Gareth L. Bannister, East Sussex (GB)

( * ) Notice: Subject to any disclaimer, the term of this patent is extended or adjusted under 35 U.S.C. 154(b) by 521 days.

(21) Appl. No.: 12/513,060

(22) PCT Filed: Oct. 31, 2007

(86) PCT No.: PCT/GB2007/004154
§ 371 (c)(1),
(2), (4) Date: Jul. 12, 2010

(87) PCT Pub. No.: WO2008/053211
PCT Pub. Date: May 8, 2008

(65) Prior Publication Data
US 2010/0296792 A1 Nov. 25, 2010

(30) Foreign Application Priority Data

Oct. 31, 2006 (GB) .................................. 0621753.3

(51) Int. Cl.
G02B 6/36 (2006.01)
G02B 6/00 (2006.01)

(52) U.S. Cl.
USPC ............................................ 385/78; 385/137

(58) Field of Classification Search
None
See application file for complete search history.

(56) References Cited

U.S. PATENT DOCUMENTS 5,355,429 A 10/1994 Lee et al.
2007/0201808 A1* 8/2007 Bannister et al. ............. 385/138

FOREIGN PATENT DOCUMENTS

| EP | 1500961 | 1/2005 |
| GB | 2274178 | 7/1994 |
| WO | 2005/103786 | 11/2005 |

OTHER PUBLICATIONS

International Search Report for corresponding application No. PCT/GB2007/004154 completed Feb. 22, 2008.

* cited by examiner

Primary Examiner — Tina Wong
(74) Attorney, Agent, or Firm — Renner, Otto, Boisselle & Sklar, LLP

(57) ABSTRACT

An assembly, in particular for interfacing an embedded element, in particular a waveguide, at the surface of a substrate, such as a composite panel which forms part of a vehicle, typically an aircraft, to an external module, consolidation tooling for mounting an assembly to a substrate, and a method of mounting an assembly to a substrate.

24 Claims, 11 Drawing Sheets

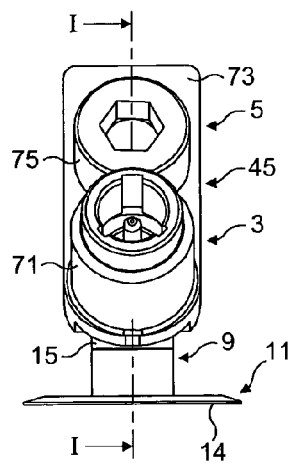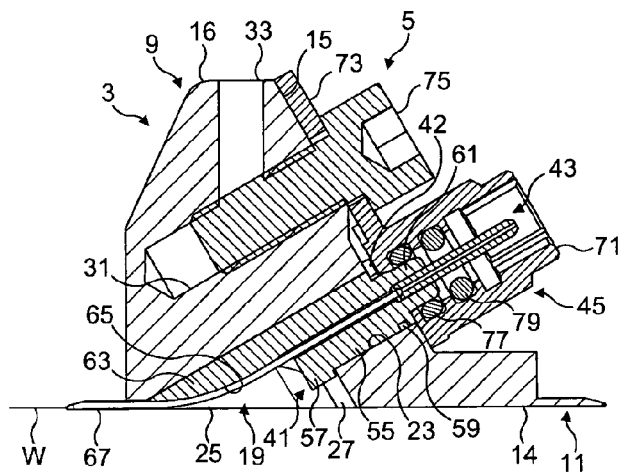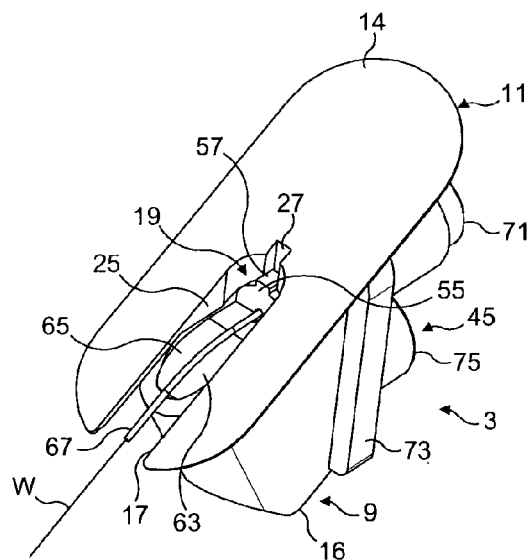

INTERFACE ASSEMBLY, CONSOLIDATION TOOLING AND METHOD OF MOUNTING AN INTERFACE ASSEMBLY TO A SUBSTRATE

This application is a national phase of International Application No. PCT/GB2007/004154 filed Oct. 31, 2007 and published in the English language.

The present invention relates to an assembly, in particular for interfacing an embedded element, in particular a waveguide, at the surface of a substrate, such as a composite panel which forms part of a vehicle, typically an aircraft, to an external module, consolidation tooling for mounting an assembly to a substrate, and a method of mounting an assembly to a substrate.

The embedding of waveguides, typically optical waveguides, within substrates, such as composite panels, is well established, and provides particular advantages over traditional metal wiring, insofar as the waveguides are integrally formed with the panels and provide a lightweight structure, which is relatively noise immune.

The interfacing of such waveguides has represented a particular problem, insofar as the waveguides are relatively delicate structures which can be easily damaged, and fabrication can be particularly time consuming, which has significant cost implications.

Traditionally, waveguides were terminated at the edges of panels, but, as will be appreciated, termination at the edges of panels has the particular disadvantage of limiting the application of the panels to those where the edges of the panels are accessible.

More recently, waveguide assemblies have been developed which provide for termination at the surfaces of panels. Examples of such waveguide assemblies are disclosed in U.S. Pat. No. 5,355,429 and WO-A-2005/103786.

Such waveguide assemblies overcome the disadvantage as regards edge termination, but still exhibit a number of drawbacks, insofar as the waveguide assemblies are relatively complex structures which require fitting by highly-skilled operatives.

It is an aim of the present invention to provide an improved assembly, particularly as regards the required mounting operations, consolidation tooling for mounting an assembly to a substrate, and a method mounting an assembly to a substrate.

In one aspect the present invention provides an assembly for interfacing an embedded element, in particular a waveguide, which is embedded in a substrate at a surface of the substrate, the assembly comprising: a housing which is mounted to the substrate, wherein the housing includes a lower, mounting face which is disposed to the surface of the substrate and includes at least one channel for receiving the embedded element which is embedded in the substrate, and a connector recess which opens to the at least one channel in the mounting face; and a connector unit which comprises a connector assembly comprising a ferrule to which the embedded element is terminated and a connector body to which the ferrule is attached, and a connector element which is disposed about the ferrule; wherein the connector recess is configured such as to receive the connector assembly of the connector unit when pre-terminated on the embedded element, thereby providing for fitting of the housing to the connector assembly subsequent to termination of the embedded element.

In another aspect the present invention provides an assembly for interfacing an embedded element, in particular a waveguide, at a surface of a substrate, the assembly comprising: a housing which is mounted to the substrate, wherein the housing includes a lower, mounting face which is disposed to the surface of the substrate, and a connector recess which opens to the mounting face; and a connector unit which comprises a connector assembly comprising a ferrule to which the embedded element is terminated and a connector body to which the ferrule is attached, wherein the connector assembly is fitted in the connector recess.

In a further aspect the present invention provides consolidation tooling for mounting an assembly to a surface of a substrate comprising a plurality of layers, wherein the assembly comprises a housing which comprises a body member and a flange member which extends about a lower peripheral edge of the body member, and a connector unit which is disposed to the housing and comprises a connector assembly which comprises a ferrule to which an embedded element, in particular a waveguide, is terminated and a connector body to which the ferrule is attached, wherein the consolidation tooling comprises: a pressure-exerting member which is configured to receive the body member of the housing and exert a downward pressure onto the flange member of the housing, such as to exert a compressive force onto the layers of the substrate which are located above the flange member; and a biasing unit which is in use attached to the housing and operative to apply a downward biasing force to the pressure-exerting member.

In a still further aspect the present invention provides consolidation tooling for mounting an assembly to a surface of a substrate comprising a plurality of layers, wherein the assembly comprises a housing which comprises a body member and a flange member which extends about a lower peripheral edge of the body member, and a connector unit which is disposed to the housing and comprises a connector assembly which comprises a ferrule to which an embedded element, in particular a waveguide, is terminated and a connector body to which the ferrule is attached, wherein the consolidation tooling comprises a pressure-exerting member which is configured to receive the body member of the housing and provide for transmission of a downward pressure onto the flange member of the housing, which is such as to exert a compressive force onto the layers of the substrate which are located above the flange member, and the consolidation tooling is a sacrificial component, which remains bonded to the substrate following mounting of the assembly.

In a still yet further aspect the present invention provides a method of mounting an assembly to a surface of a substrate, the method comprising the steps of: providing a connector assembly comprising a ferrule and a connector body to which the ferrule is attached; pre-terminating the connector assembly to an embedded element, in particular a waveguide; providing a housing which includes a lower, mounting face and a connector recess which opens to the mounting face; inserting the pre-terminated connector assembly into the connector recess in the housing; locating the mounting face of the housing on the substrate; and fabricating the substrate, during which fabrication the housing is bonded to the substrate.

Preferred embodiments of the present invention will now be described hereinbelow by way of example only with reference to the accompanying drawings, in which:

FIG. 3 illustrates an elevational view from the front end of the connector of FIG. 1;

FIG. 4 illustrates a vertical sectional view (along section I-I in FIG. 3) of the waveguide assembly of FIG. 1;

FIG. 5 illustrates an underneath view of the waveguide assembly of FIG. 1;

FIGS. 1 to 5 illustrate a waveguide assembly in accordance with a first embodiment of the present invention.

Figure 1:
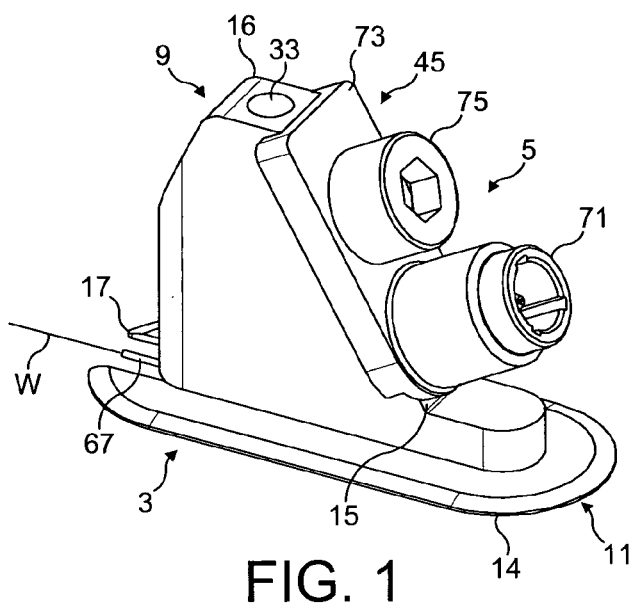
FIG. 1 illustrates a perspective view of a waveguide assembly in accordance with a first embodiment of the present invention.
Figure 2:
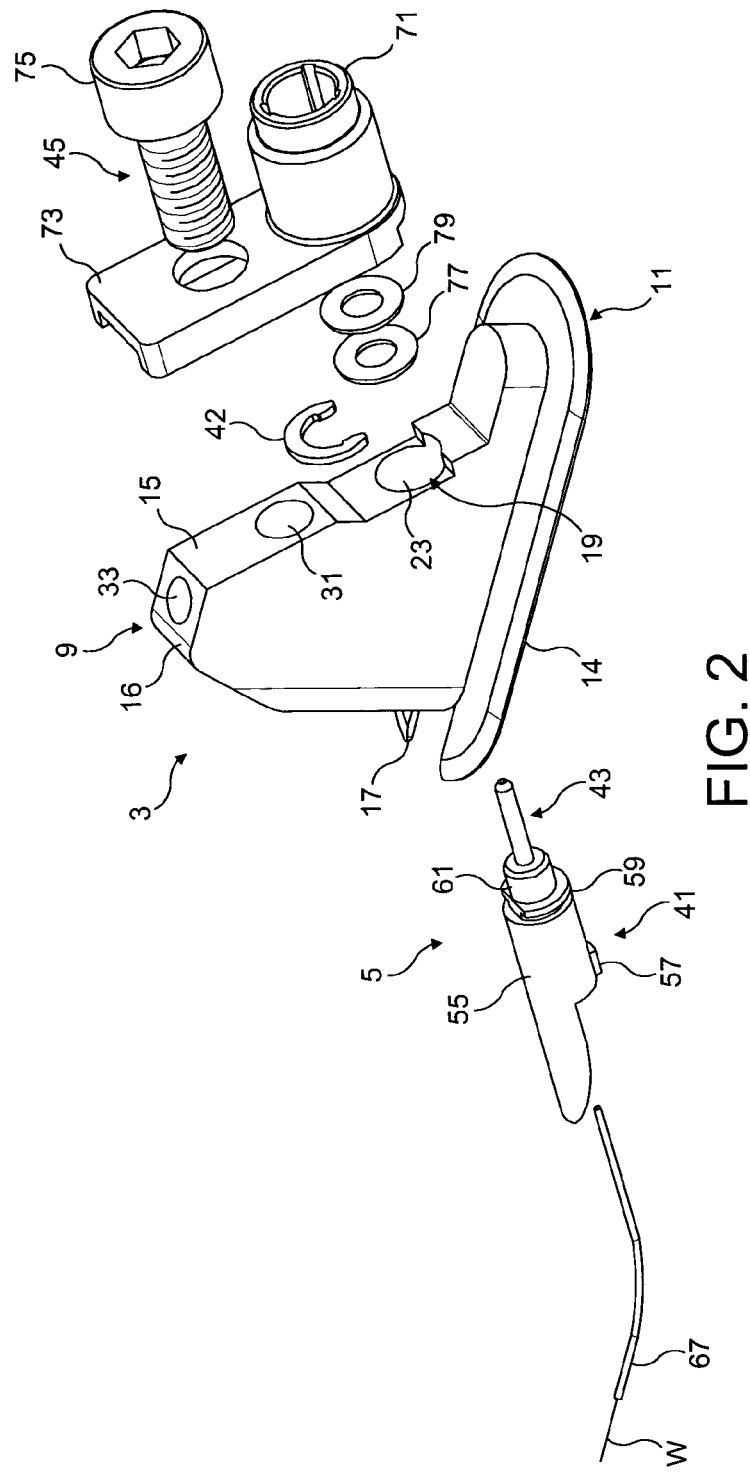
FIG. 2 illustrates an exploded perspective view of the waveguide assembly of FIG. 1.

The waveguide assembly comprises a housing 3 which is mounted to a substrate, such as a composite panel formed of a plurality of layers or plies, in this embodiment by embedding a part of the housing 3 in the substrate, and a connector unit 5 which is attached to the housing 3 and provides for connection to an external component.

The housing 3 comprises a main body member 9 and a flange member 11, which extends about a lower peripheral edge of the body member 9, such as to define a structure which in this embodiment is embedded between layers of the panel to which the waveguide assembly is mounted.

In this embodiment the body member 9 comprises an upstanding member which has a narrow, elongate section, a flat, lower mounting face 14, an inclined front, contact face 15 and an upper face 16. In having a narrow section, the disruption to the surface of the panel to which the waveguide assembly is mounted is minimized and the structural integrity of the panel retained.

The body member 9 includes a waveguide recess 17 in the mounting face 14 thereof which extends to the rear peripheral edge of the flange member 11 and provides for the passage into the housing 3 of a waveguide W which is embedded in the panel, and a connector recess 19, which extends from the front face 15 thereof and opens to the waveguide recess 17, and receives a connector body 41 of the connector unit 5, as will be described in more detail hereinbelow.

In this embodiment the waveguide recess 17 has a wide, elongate section which accommodates a tow which is provided to the waveguide W. The tow typically comprises a continuous bundle of reinforcing fibers, such as glass or carbon fibers, which are spread out into a thin, flat tape, and the waveguide W is fixed to the center of the tape. As will be described in more detail hereinbelow, the tow provides strain relief to the waveguide prior to assembly of the waveguide assembly and during handling in embedding the waveguide assembly. In an alternative embodiment the waveguide W need not include a tow.

In this embodiment the connector recess 19 comprises a cylindrical channel 23, here a circular channel, which opens to the front face 15 of the body member 9, and a cavity 25 which extends from the cylindrical channel 23 and opens to the bottom face 14 of the body member 9 from substantially a mid point to the rear edge thereof.

In this embodiment the cylindrical channel 23 includes a cut-out 27 at the rear edge thereof, which acts as a detent, as will be described in more detail hereinbelow.

As will be described in more detail hereinbelow, the configuration of the connector recess 19 provides for the fitting of the housing 3 subsequent to termination of the waveguide W.

The body member 9 further includes a fixing recess 31, in this embodiment a threaded recess, to which a fixing element 75 of the connector unit 5, in this embodiment a threaded screw, is fixed.

The body member 9 further includes an attachment recess 33, in this embodiment a threaded recess, to which consolidation tooling is attached, as will be described in more detail hereinbelow.

The flange member 11 comprises a thin, flat section which has a tapered outer edge, such as to present a structure which provides a limited disruption to the layers of the panel to which the waveguide assembly is mounted. By providing for a smooth transition from the layers which define the main body of the panel over the flange member 11, the formation of resin pockets is avoided, which pockets could lead to structural weaknesses.

In this embodiment the waveguide recess 17 extends through one, rear end of the flange member 11, which allows for the passage of a waveguide W between the layers of the panel in alignment with the plane of the flange member 11.

The connector unit 5 comprises a connector body 41 which is disposed in the connector recess 19 in the body member 9, a locking element 42, in this embodiment a circlip, which acts to lock the connector body 41 in the connector recess 19, a ferrule 43, in this embodiment an optical ferrule, here a ceramic ferrule, which is coupled to the waveguide W and fixed to the connector body 41, and a connector element 45, which is disposed about the ferrule 43 and fixed to the body member 9, in this embodiment the front face 15 of the body member 9.

The connector body 41 comprises a main body part 55, in this embodiment a cylindrical body, here a circular body, which is disposed in the cylindrical channel 23 of the connector recess 19 in the body member 9, and includes a lug 57 at a rear end thereof, which acts as a detent which is configured to be located in the cut-out 27 in the connector recess 19 and locates the connector body 41 at a predetermined position within the connector recess 19, and a recess 59 at a forward end thereof, which is such as to receive the locking element 42, which acts to lock the connector body 41 in the predetermined position. In this embodiment the body part 55 is configured to be a close sliding fit in the connector recess 19 in the body member 9, such that the connector body 41 is precisely located within the housing 3.

In this embodiment the positioning and alignment of the connector body 41, and hence the waveguide W, advantageously allows for the use of angled physical contacts (APCs) and tuned contacts.

The connector body 41 further comprises a coupling part 61, in this embodiment a cylindrical part, which extends forwardly of the body part 55 and to which the ferrule 43 is fitted.

The connector body 41 further comprises a support part 63, which extends rearwardly of the body part 55, in this embodiment from an upper edge of the body part 55, and includes a guide path 65 which defines a bend radius which restricts the extent of the bending of the waveguide W, such as to prevent damage to the same. In this embodiment the support part 63 is configured such as to allow the connector body 41 to be maintained in an inclined orient from the surface of the panel which allows for fitting of the housing 3 thereto, but prevents the waveguide W from being bent beyond a predetermined extent which could damage the waveguide W. In this embodiment the position, and hence orientation, of the support part 63 is fixed by the positioning and alignment of the connector body 41.

In this embodiment the tow which is fixed to the waveguide W is bonded to the support part 63, along part or the entire length thereof, such as to provide strain relief to the waveguide W prior to assembly of the waveguide assembly and during handling of the waveguide assembly.

In this embodiment the waveguide W is shielded by a protective sheath 67, which extends from the waveguide recess 17 to the ferrule 43. In this embodiment the sheath 67 is formed of a flexible plastics material, here a PEEK material. In an alternative embodiment the sheath 67 could be omitted.

With this configuration, the present invention provides for the waveguide W to be pre-terminated, prior to fitting of the housing 3 and the embedding operation. By allowing for pre-termination, the present invention advantageously avoids the need for the threading of the housing 3 over the waveguide W and the supporting of the waveguide W in the termination operation, which can cause damage to the waveguide W, with the housing 3 being a relatively bulky component and the waveguide W being a sensitive element which is prone to damage, particularly bending damage. In addition, in not having to thread the housing 3 over the waveguide W, a tow, which is substantially wider than the waveguide W and would not pass through the housing 3, can be provided to the waveguide W.

The connector element 45 comprises a shell coupling 71, in this embodiment comprising a substantially cylindrical section, which surrounds the ferrule 43 and engages the coupling element 61 of the connector body 41, and a fixing plate 73 which extends laterally from the shell coupling 71, in this embodiment being integrally formed therewith, and is fixed to the front face 15 of the body member 9 by a fixing element 75, in this embodiment a threaded screw.

In this embodiment the shell coupling 71 includes first and second sealing members 77, 79, here O-rings, which are disposed within the shell coupling 71, such that the first sealing member 77 provides a hermetic seal between the shell coupling 71 and the coupling element 61 of the connector body 41 and the second sealing member 79 is arranged to provide a hermetic seal between the shell coupling 71 and a mating coupling (not illustrated) when fitted to the shell coupling 71.

In this embodiment the connector element 45 is fixed to the body member 9 by a single fixing element 75. By requiring only a single fixing element 75, problems associated with using a plurality of fixing points can be avoided, in particular an undesirable axial mis-alignment between the shell coupling 71 and the ferrule 43 owing to biasing of the connector element 45. The use of a single fixing element also advantageously requires only a single operation.

The waveguide assembly of the present invention also advantageously provides for the elements of the connector unit 5 to be interchanged, allowing adaptation to provide connection to multiple standard and harsh environment connector interfaces. Such interfaces include FC/PC, LC, ST, SC, RSC, MC3, MC5, MIL-T-29504 (contact), MIL-C-38999, MIL-C-28876, ARINC 801 and NGCon.

Figure 6:
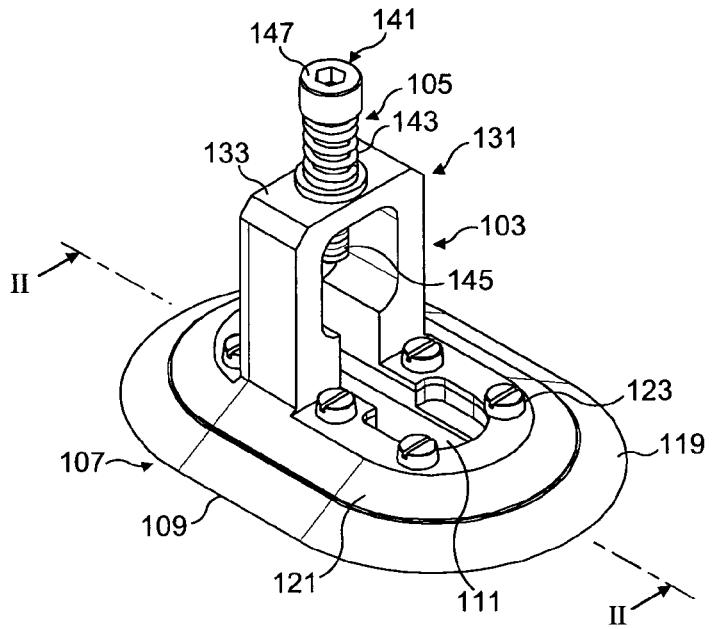
FIG. 6 illustrates a perspective view of consolidation tooling in accordance with a first embodiment of the present invention for use in mounting the waveguide assembly of FIG. 1 to a substrate.
Figure 7:
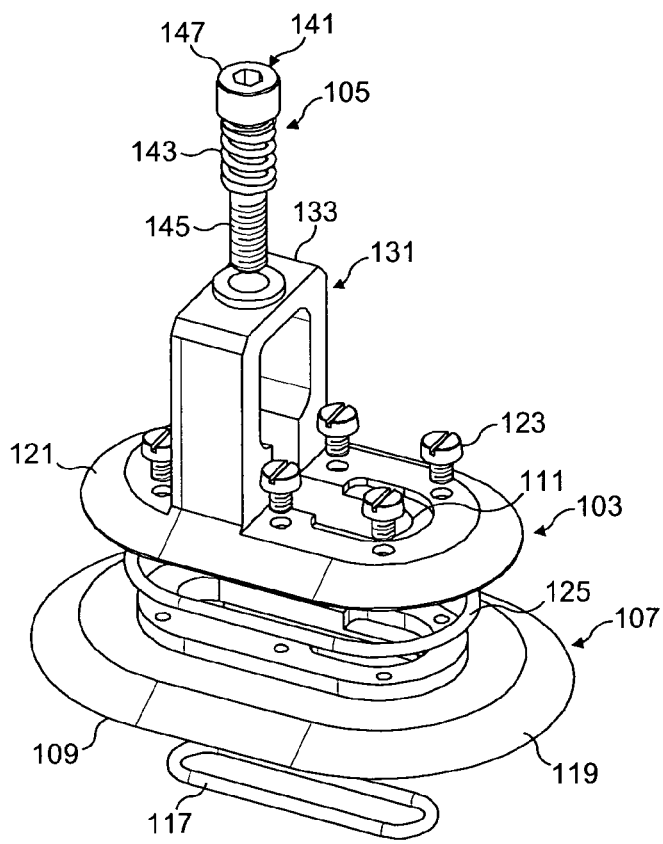
FIG. 7 illustrates an exploded perspective view of the consolidation tooling of FIG. 6.
Figure 8:
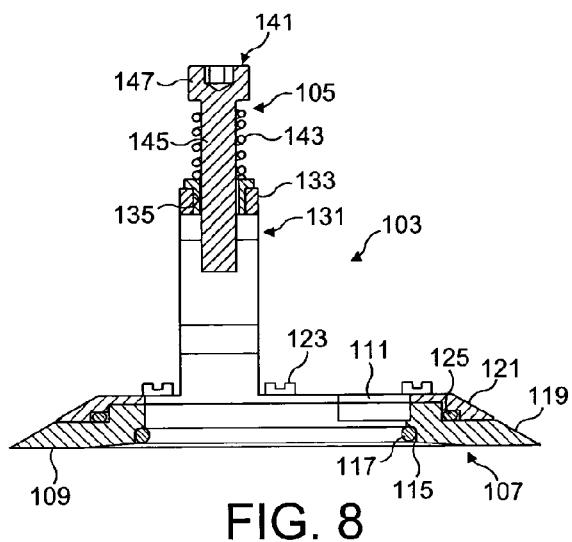
FIG. 8 illustrates a vertical sectional view (along section II-II in FIG. 6) of the consolidation tooling of FIG. 6.

FIGS. 6 to 8 illustrate consolidation tooling in accordance with one embodiment of the present invention for use in mounting the waveguide assembly of the above-described first embodiment to a panel, in particular the embedding of the waveguide assembly between the layers or plies of a composite panel.

The consolidation tooling comprises a pressure-exerting member 103 which is configured to receive the body member 9 of the housing 3 of the waveguide assembly and exert a downward pressure onto the flange member 11 of the housing 3, such as to exert a compressive force onto the layers of the panel which are located above the flange member 11 of the housing 3, as will be described in more detail hereinbelow, and a biasing unit 105 for applying a downward biasing force to the pressure-exerting member 103. By exerting a compressive force onto the layers of the panel above the flange member 11 of the housing 3, a good structural bond can be achieved in mounting the waveguide assembly to the panel.

The pressure-exerting member 103 comprises an annular element 107 which presents a lower pressure-exerting surface 109 and has a central aperture 111, in this embodiment of elongate section which corresponds to the elongate section of the body member 9 of the housing 3, such that the inner peripheral edge of the annular element 107 abuts the outer peripheral surface of the body member 9 of the housing 3.

In this embodiment the annular element 107 includes a recess 115 about the inner peripheral edge thereof, and the pressure-exerting member 103 further comprises an annular seal 117, here in the form of an O-ring, which is disposed in the peripheral recess 115 and provides for a hermetic seal between the annular element 107 and the body member 9, such as to prevent the ingress of resin between the consolidation tooling and the body member 9, which could undesirably lead to bonding of the consolidation tooling to the waveguide assembly.

In this embodiment the annular element 107 has a lateral width which is substantially greater than the lateral width of the flange member 11, such that a compressive force is applied to the layers of the panel over a surface beyond the outer peripheral edge of the flange member 11.

In this embodiment the lower, inner peripheral surface of the annular element 107 is profiled such as to have a profile corresponding to that of the flange member 11, such that the annular element 107 provides for the application of a substantially uniform compressive force over the lateral width thereof.

In this embodiment the annular element 107 comprises a lower annular part 119, here formed of a material having a low coefficient of adhesion, such as PTFE, and an upper annular part 121, here formed of a metal, such as aluminium.

In this embodiment the annular parts 119, 121 of the annular element 107 are separable parts which are fixed together by fixing elements 123, here threaded screws, and the annular element 107 further comprises an annular seal 125, here in the form of an O-ring, therebetween.

The pressure-exerting member 103 further comprises a coupling element 131 which couples the annular element 107 thereof to the biasing unit 105, such as to transmit the biasing force of the biasing unit 105 to the annular element 107.

In this embodiment the coupling element 131 comprises an inverted U-shaped element which is configured such as to extend over the body member 9 of the housing 3 about the respective sides thereof, with an upper bridge section 133 thereof including an aperture 135 through which extends a fixing element 141 of the biasing unit 105, as will be described in more detail hereinbelow.

In this embodiment the coupling element 131 is integrally formed with the upper annular part 121 of the annular element 107.

The biasing unit 105 comprises a fixing element 141, in this embodiment a threaded element, which is fixed in the fixing aperture 33 in the upper face 16 of the body member 9, and a biasing element 143, in this embodiment a spring element, which is configured to apply a biasing force between the fixing element 141 and the bridge section 133 of the coupling element 131, such as to exert a downward force onto the bridge section 133 of the coupling element 131 and hence the annular element 107.

In this embodiment the fixing element 141 comprises a shaft section 145 and an enlarged section 147, here the head thereof, and the biasing element 143 comprises a compression spring which is disposed about the shaft section 145, such as to apply a biasing force between the enlarged section 147 and the bridge section 133 of the coupling element 131.

Figure 9:
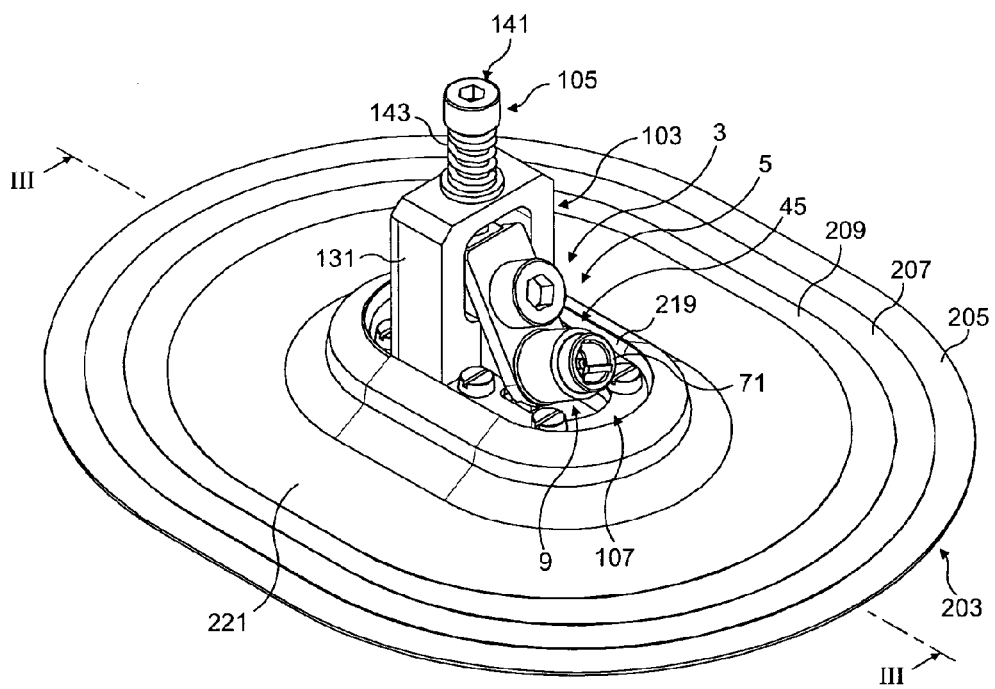
FIG. 9 illustrates a perspective view of an operative configuration of the consolidation tooling of FIG. 6 where utilized in mounting the waveguide assembly of FIG. 1 to a substrate.
Figure 10:
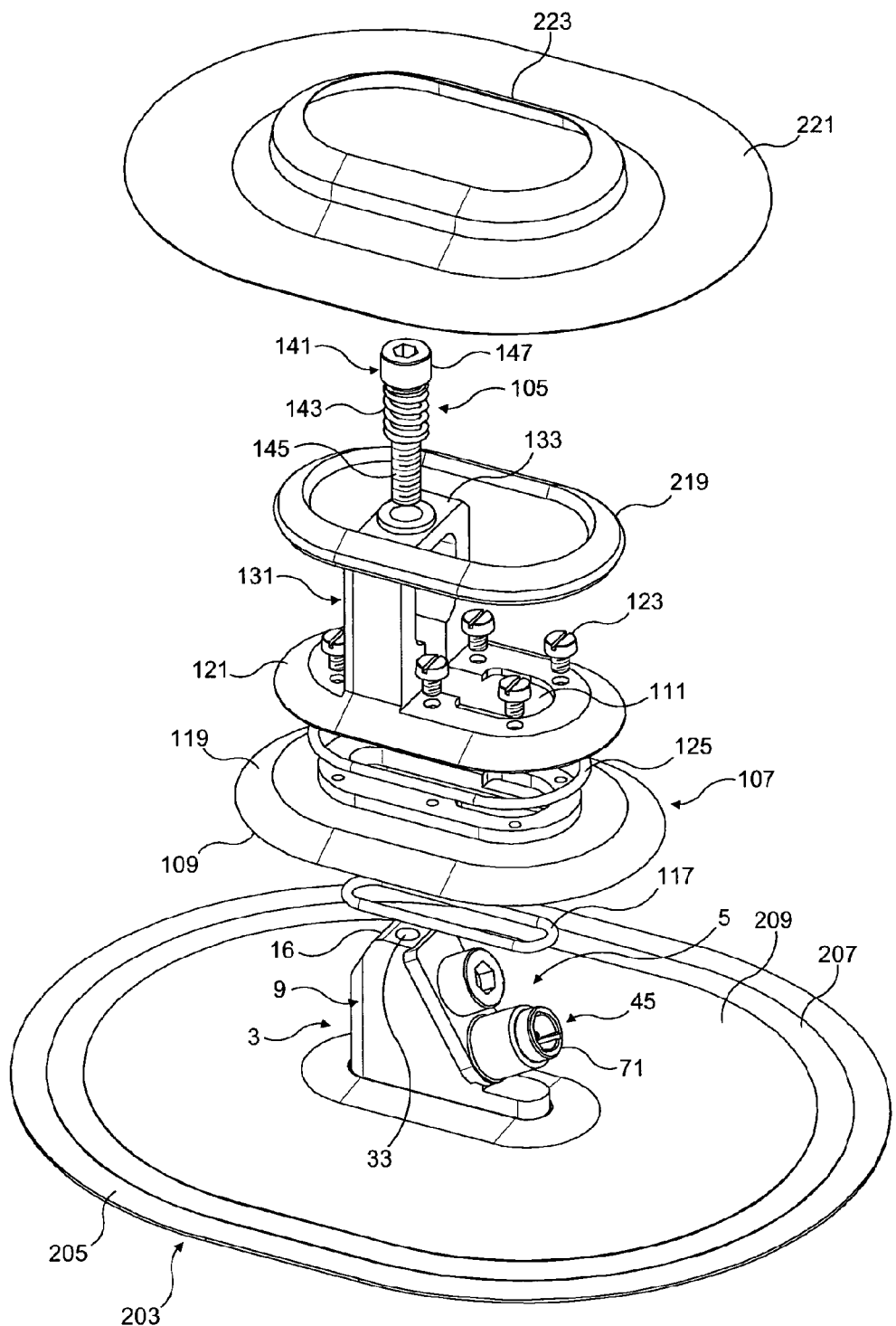
FIG. 10 illustrates an exploded perspective view of the operative configuration of FIG. 9.
Figure 11:
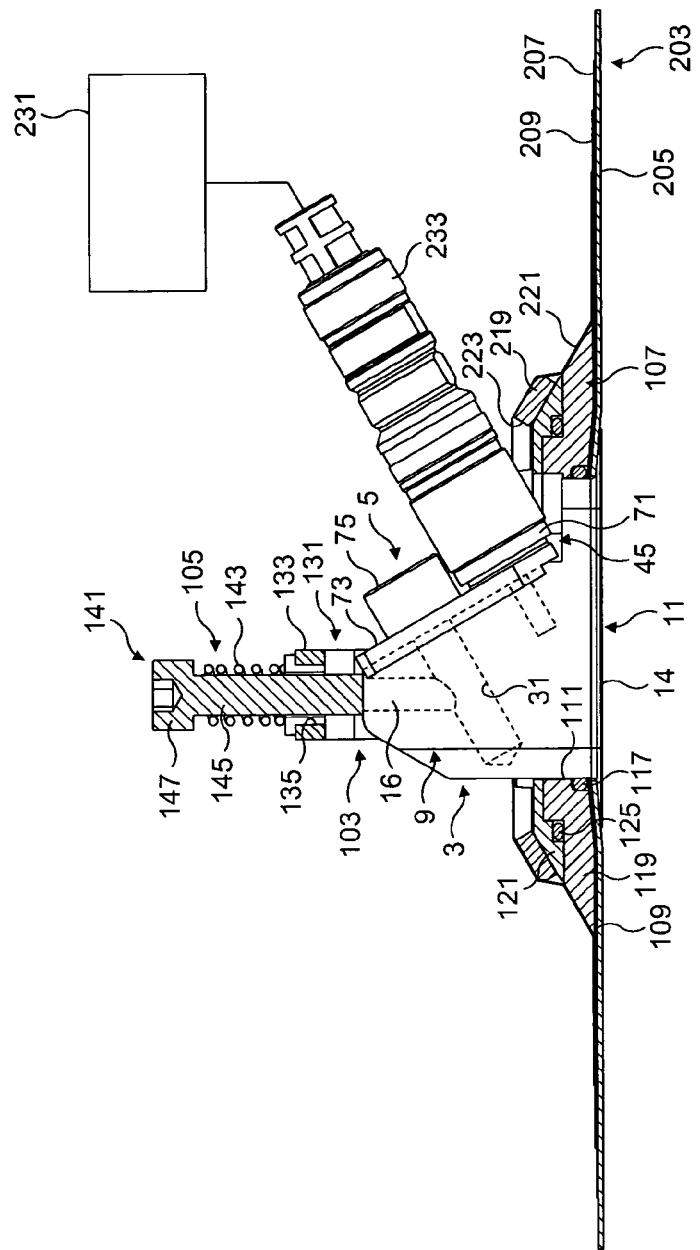
FIG. 11 illustrates a vertical sectional view (along section III-III in FIG. 9) of the operative configuration of FIG. 9.
Figure 12:
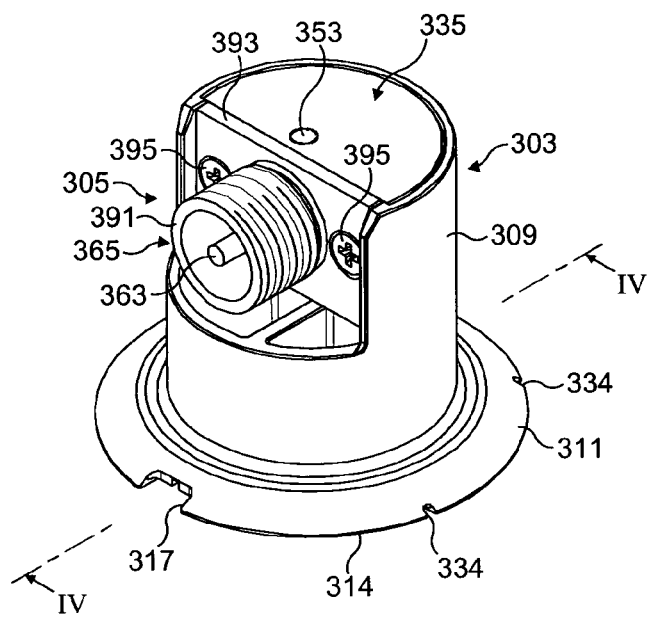
FIG. 12 illustrates a perspective view from the front and above of a waveguide assembly in accordance with a second embodiment of the present invention.
Figure 13:
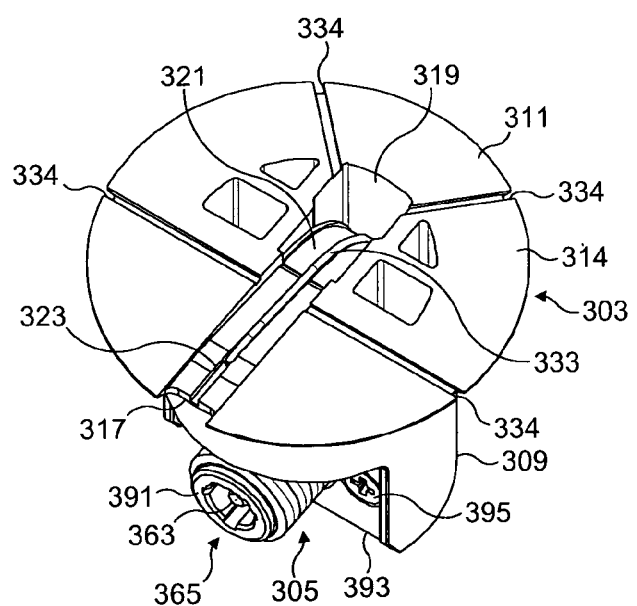
FIG. 13 illustrates a perspective view from the front and below of the waveguide assembly of FIG. 12.
Figure 14:
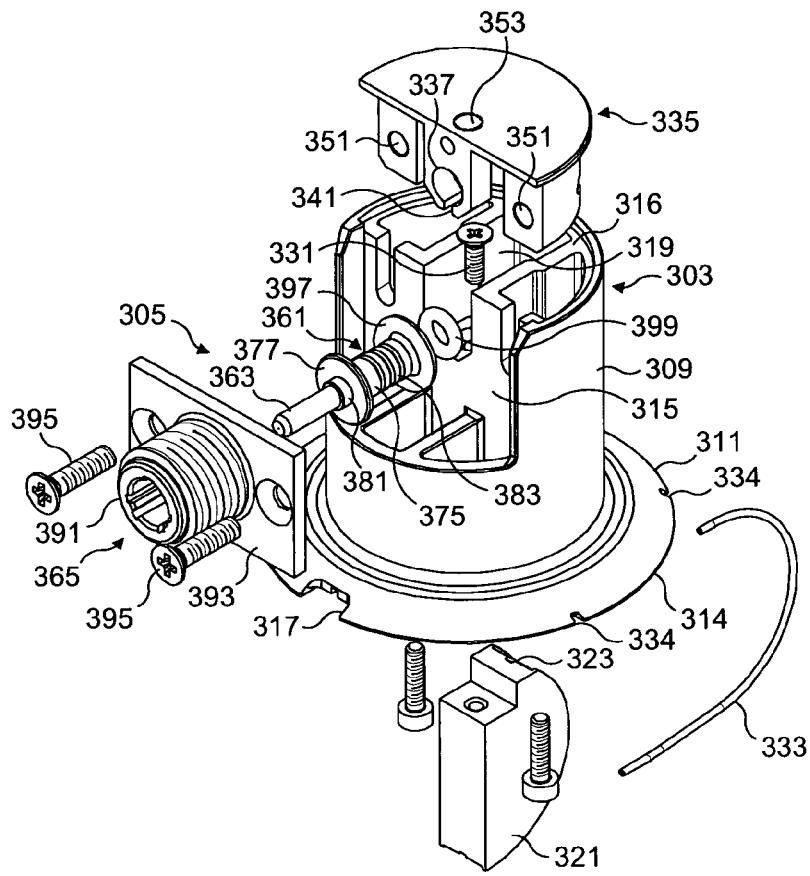
FIG. 14 illustrates an exploded perspective view of the waveguide assembly of FIG. 12.
Figure 15:
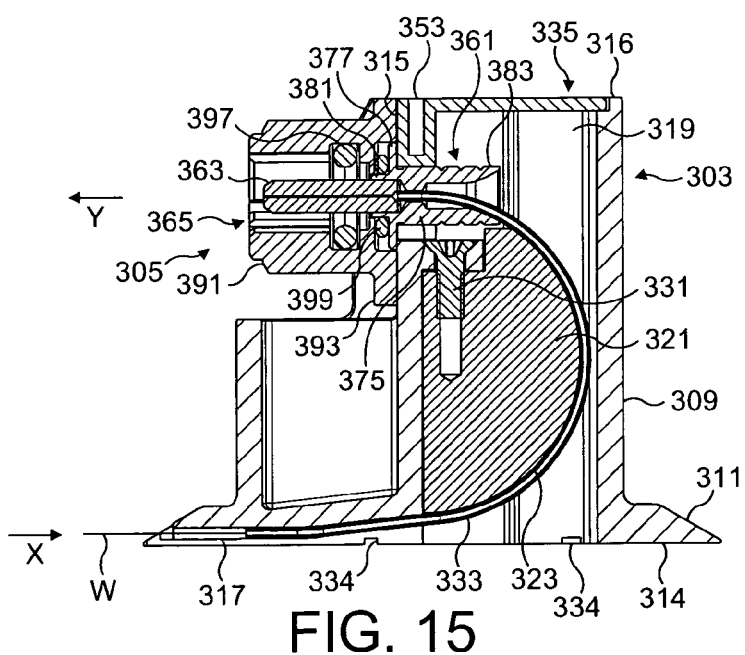
FIG. 15 illustrates a vertical sectional view (along section IV-IV in FIG. 12) of the waveguide assembly of FIG. 12.

FIGS. 9 to 11 illustrate an operative configuration of the above-described consolidation tooling where utilized in mounting the above-described waveguide assembly to a substrate, in this embodiment a composite panel 203 which comprises a plurality of plies or layers 205.

In this embodiment the waveguide assembly is assembled and located within the layers 205 of the panel 203, as now described hereinbelow.

The waveguide W is first pre-terminated by fitting the connector body 41 to the waveguide W, terminating the waveguide W with the ferrule 43 and fitting the ferrule 43 to the coupling part 61 of the connector body 41. As described hereinabove, the waveguide assembly advantageously allows for pre-termination of the waveguide W prior to fitting of the housing 3.

In this embodiment the support element 63 of the connector body 41 has a guide path 65 with a pre-defined bend radius, and the tow, which is bonded to the support element 63, restricts the bending of the waveguide W and prevents damage thereto.

The connector body 41 is then inserted into the connector recess 19 in the housing 3, such that the body part 55 thereof is located in the channel 23 of the connector recess 19 and the lug 57 on the body part 55 is located in the cut-out 27 in the connector recess 19.

The connector body 41 is then fixed to the housing 3 by locating the fixing element 42, in this embodiment a circlip, in the recess 59 at the forward end of the body part 55.

The connector element 45 is then mounted to the housing 3, in this embodiment by locating the shell coupling 71 over the ferrule 43 and fixing the fixing plate 73 to the front face 15 of the body member 9 by locating the fixing element 75 in the fixing recess 31 in the front face 15 of the housing 3.

In this embodiment the connector recess 19 is filled with a filler, typically a potting compound.

The resulting waveguide assembly is then ready for mounting to the panel 203.

The housing 3 is located in the layers 205 of the panel 203, in this embodiment by locating the flange member 11 between the layers 205 of the panel 203, where one or more of the layers 205 include an aperture having the same shape as the body member 9, such that the body member 9 extends through the layers 205.

A peel ply 207, which includes an aperture having the same shape as the body member 9, is then located over the body member 9 onto the upper surface of the layers 205 of the panel 203.

A release film 209, which includes an aperture having the same shape as the body member 9, is then located over the peel ply 207.

The consolidation tooling is then located over the body member 9, such that the body member 9 extends through the aperture 111 in the annular element 107 of the pressure-exerting member 103 and the annular seal 117 provides a seal between the annular element 107 and the body member 9.

The biasing unit 105 of the consolidation tooling is then attached to the waveguide assembly such as to apply a downward force to the annular element 107 of the pressure-exerting member 103, which acts to compress the layers 205 of the panel 203 through the release film 209 and the peel ply 207 as disposed over the layers 205 of the panel 203.

In this embodiment the biasing of the pressure-exerting member 103 is achieved by fixing the fixing element 141 to the body member 9 of the housing 3, here by threading the fixing element 141 to a predetermined extent into the fixing aperture 33 in the upper face 16 of the housing 3, such that the biasing element 143 applies a downward force to the bridge section 133 of the coupling element 131 and hence the annular element 107.

Following the fitting of the consolidation tooling, an adhesive element 219, in this embodiment a length of adhesive tape, is located about the upper peripheral surface of the annular element 107. In one embodiment the adhesive element 219 could be pre-formed to have the annular shape of the annular element 107.

A sealing film 221 is then located over the consolidation tooling. The sealing film 221 includes an aperture 223 of a size corresponding to the annular element 107, such that the shell coupling 71 of the connector element 45 is accessible, and the lower, inner peripheral surface of the sealing film 221 is bonded to the adhesive element 219, with the sealing film 221 extending laterally outwardly therefrom.

In this embodiment a monitoring unit 231 is coupled to the shell coupling 71 of the connector element 45, here by a mating connector 233, as illustrated in FIG. 11, and characteristics of the waveguide W are monitored during the fabrication process, in particular in the placement of the waveguide W, the laying-up of the layers 205 of the panel 203 and the curing of the panel 203, such as to monitor the status of the waveguide W during the fabrication process and enable the early identification of any possible defects, which could allow for rectification.

It is a particular advantage of the waveguide assembly and the consolidation tooling of the present invention that the waveguide assembly is functional from the outset and prior to the curing operation and allows the consolidation tooling to be located thereover, which enables the use of the waveguide assembly to monitor characteristics of the waveguide W during the fabrication process, for example, which are representative of temperature, strain, pressure and cure status.

The panel 203 is then ready for curing, typically in a vacuum bag and optionally in an autoclave, as is known in the art.

Following the curing process, the consolidation tooling is removed.

In this embodiment the lower annular part 119 of the annular element 107 is configured to be released from the panel 203.

In an alternative embodiment the lower annular part 119 of the annular element 107 can be configured such as to be bonded to the panel 203 in the curing process, such that the lower annular part 119 is a sacrificial component which remains on the panel 203.

In this embodiment the remainder of the consolidation tooling is separated from the lower annular part 119, allowing for re-use with a new lower annular part 119.

In this embodiment the lower peripheral surface of the lower annular element 119 is grooved, which assists in ensuring the flow of resin into contact with the entire peripheral surface and provides a key for the bond with the resin.

In one embodiment the lower annular element 119 can be configured to confer additional mechanical strength to the embedded waveguide assembly, in effect anchoring the waveguide assembly to the surface of the panel.

In one embodiment the lower annular element 119 can be formed of the same material as the housing 3.

In one embodiment a film of a resin or bonding agent can be located beneath the lower annular element 119, such as to improve the bonding of the consolidation tooling to the panel.

FIGS. 12 to 15 illustrate a waveguide assembly in accordance with a second embodiment of the present invention.

The waveguide assembly comprises a housing 303 which is mounted to a substrate, such as a composite panel, in this embodiment by embedding a part of the housing 303 in the substrate, and a connector unit 305 which is attached to the housing 303 and provides for connection to an external connector.

In this embodiment the housing 303 is formed from a material which has material properties, in particular coefficient of thermal expansion and modulus of elasticity (stiffness), which closely match the mechanical properties of the surrounding structure, such as to achieve a low stress gradient between the host structure and the embedded housing 303.

In addition, the housing 303 is formed from a material which provides for an optimal bond strength with the surrounding structure, such as to minimize the risk of de-lamination, which can cause a structural weakness and a point of entry for liquids and other contaminants, which can ultimately result in movement, and hence damage, to the waveguide assembly.

In this embodiment the housing 303 is preferably formed of glass or carbon fiber re-inforced PPS and PEEK materials.

The housing 303 comprises a main body member 309, and a flange member 311, which extends about a lower peripheral edge of the body member 309, such as to define a structure which in this embodiment is embedded between the layers of the composite panel to which the waveguide assembly is mounted.

In this embodiment the body member 309 comprises an upstanding member which has a cylindrical outer section, here a circular section, a flat bottom face 314, a recessed front face 315, which is configured such that the connector unit 305 does not extend over the footprint of the body member 309, and an upper face 316. In having a circular section, the layers of the panel to which the waveguide assembly is to be mounted only require the cutting of a circular aperture, which is relatively easily done as compared to other asymmetric shapes. In addition, the circular section facilitates manufacture, in allowing for manufacture by turning as opposed to milling operations. Furthermore, the circular section facilitates sealing with the consolidation tooling which is used to mount the waveguide assembly, in allowing for the use of circular sealing elements which provide a uniform sealing pressure. Still furthermore, the circular section provides for a uniform embedment strength irrespective of the direction of the bending moment.

The body member 309 includes a waveguide recess 317 in the lower face thereof which extends to the outer peripheral edge of the flange 311, and a cavity 319 in a rear section thereof which is in communication with the front face 315 and the waveguide recess 317.

The body member 309 further comprises a waveguide locator 321, which is disposed in the cavity 319, such as to guide the waveguide W from the waveguide recess 317 in the lower surface of the body member 309 to the front face 315 of the body member 309 for termination at the connector unit 305.

In this embodiment the waveguide locator 321 includes a guide path 323, here a substantially semi-circular guide path, which defines a bend radius which re-directs the waveguide W about 180 degrees from a first direction X, which is in a direction into and substantially parallel to the bottom face 314 of the body member 309, to a second direction Y, opposite the first direction, which is substantially parallel, but vertically spaced from the bottom face 314 of the body member 309. This configuration advantageously allows for the mating connector, which mates to the connector unit 305, to extend parallel to the surface of the panel, and also allows the waveguide assembly to be located in a concealed corner. In another embodiment the guide path 323 of the waveguide locator 321 could be configured to re-direct the waveguide W about an angle greater than 180 degrees, such that that mating connector is oriented downwardly towards the surface of the panel. This configuration is advantageous, in promoting the external cabling from the mating connector to lay flush to the panel.

In this embodiment the waveguide locator 321 is an insert which is removably mounted within the cavity 319 in the body member 309, here from the bottom face 314 of the body member 309. In this embodiment the waveguide locator 321 is fixed to the body member 309 by a fixing element 331, here a threaded screw. As will be described in more detail hereinbelow, by arranging for the waveguide locator 321 to be removable from the body member 309, the waveguide W can be pre-terminated and a connector body 361 and ferrule 363 to which the waveguide W is terminated can be threaded through the cavity 319 in the body member 309.

In this embodiment the waveguide W is shielded by a protective sheath 333, which extends from the waveguide recess 317 to the ferrule 363. In this embodiment the sheath 333 is formed of a plastics material, here a PEEK material. In an alternative embodiment the sheath 333 could be omitted.

In this embodiment the waveguide W is provided with a tow, which is accommodated in the waveguide recess 317, which has a wide, elongate section. As described hereinabove, the tow provides strain relief to the waveguide W prior to assembly of the waveguide assembly and during handling in embedding the waveguide assembly. In an alternative embodiment the waveguide W need not include a tow.

In this embodiment the mounting face 314 of the body member 314 is profiled, here including a plurality of slots 334, which facilitates the transfer of resin over the entire surface of the mounting face 314, which promotes the bond between the mounting face 314 and the panel.

The housing 303 further comprises a support member 335 which is disposed to the upper face 316 of the body member 309 and includes a connector recess 337, which supports a connector body 361 of the connector unit 305.

In this embodiment the connector recess 337 comprises a substantially cylindrical channel, here a substantially circular channel, which opens to the front face 315 of the body member 309 and includes a through slot 341 along the length thereof, which allows for the passage of the waveguide W into the connector recess 337 and subsequently the connector body 361 to be inserted, here by sliding, into the connector recess 337. This configuration again advantageously allows for the pre-termination of the waveguide W, insofar as the fitting of the connector body 361 to the support member 335 can be performed subsequent to the termination of the waveguide W.

The support member 335 further includes at least one, in this embodiment a pair of fixing recesses 351, in this embodiment threaded recesses, on opposed sides of the connector recess 337 to which at least one, in this embodiment a pair of fixing elements 395 of the connector unit 305, here threaded screws, are fixed. In this embodiment the support member 335 is located to the rear of the front face 315 of the body member 309, such that the connector unit 305 is clamped to the front face 315 of the body member 309 by the action of the fixing elements 395.

In this embodiment the support member 335 further includes an attachment recess 353, here a threaded recess, in the upper face thereof to which consolidation tooling can be attached, in the same manner as described hereinabove in relation to the waveguide assembly of the first embodiment. In an alternative embodiment the waveguide assembly of this embodiment could be mounted without the use of consolidation tooling, typically with a vacuum bag being adhered to base of the body member 309.

The flange member 311 comprises a relatively-thin section which has a tapered outer edge, such as to present a structure which provides a limited disruption to the layers of the panel to which the waveguide assembly is mounted.

The connector unit 305 comprises a connector body 361 which is disposed in the connector recess 337 in the support member 335, a ferrule 363, in this embodiment an optical ferrule, here a ceramic ferrule, which is coupled to the waveguide W and fixed to the connector body 361, and a connector element 365, which is disposed about the ferrule 363 and fixed to the body member 309, in this embodiment the front face 315 of the body member 309.

The connector body 361 comprises a main body part 375, in this embodiment a cylindrical body, here a circular body, which is disposed in the connector recess 337 in the support member 335, and a flange element 377 which extends about the outer peripheral surface of the body part 375 at a forward end thereof and acts as a detent which locates the connector body 361 at a predetermined position within the connector recess 337. In this embodiment the body part 375 is configured to be a close sliding fit in the connector recess 337, such that the connector body 361 is precisely located to the housing 303.

The connector body 361 further comprises a coupling part 381, in this embodiment a cylindrical part, which extends forwardly of the body part 375 and to which the ferrule 363 is fitted.

The connector body 361 further comprises a support part 383, in this embodiment a cylindrical section, which extends rearwardly of the body part 375 and has an inner surface which flares outwardly to the rear end thereof, and defines a bend radius, which restricts the extent of the bending of the waveguide W, such as to prevent damage to the same.

The connector element 365 comprises a shell coupling 391, in this embodiment comprising a substantially cylindrical section, which surrounds the ferrule 363 and engages the coupling element 381 of the connector body 361, and a plate element 393 which extends laterally from the shell connector element 391, in this embodiment being integrally formed therewith, and is fixed to the front face 315 of the housing 303 by at least one, in this embodiment a pair of fixing elements 395, in this embodiment threaded screws, which act to clamp the plate element 393 to the front face 315 of the housing 303 on fixing the same into the fixing apertures 351 in the support member 335.

In this embodiment the shell connector element 391 includes first and second sealing members 397, 399, here O-rings, which are disposed within the shell connector element 391, such that the first sealing member 397 provides a hermetic seal between the shell connector element 391 and the coupling element 381 of the connector body 391 and the second sealing member 399 is arranged to provide a hermetic seal between the shell connector element 391 and a mating shell connector element (not illustrated) when fitted to the shell connector element 391.

As described hereinabove, the waveguide assembly of this embodiment advantageously allows for the pre-termination of the waveguide W, and requires no post assembly.

The mounting of the waveguide assembly in a panel can be performed using the consolidation tooling of the kind as described hereinabove.

Figure 16:
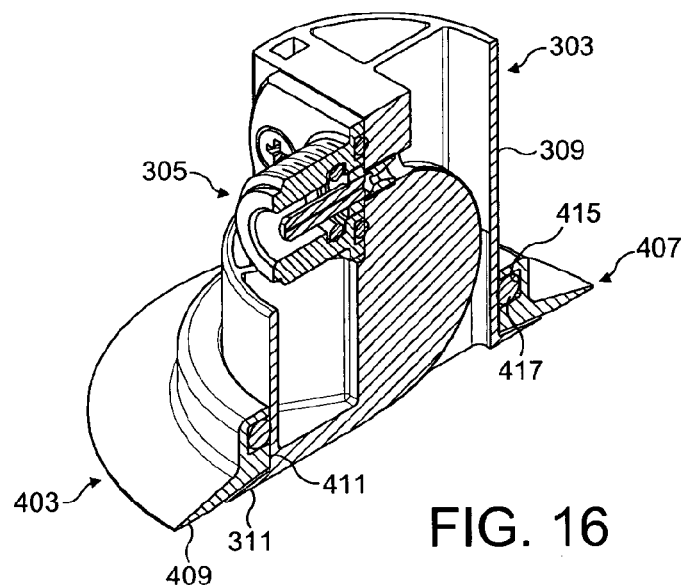
FIG. 16 illustrates a fragmentary perspective view of an operative configuration of consolidation tooling in accordance with a second embodiment of the present invention where utilized in mounting the waveguide assembly of FIG. 12 to a substrate.

FIG. 16 illustrates consolidation tooling in accordance with a second embodiment of the present invention for use in mounting the waveguide assembly of the second-described embodiment to a panel, in particular the embedding of the waveguide assembly between the layers or plies of a composite panel.

The consolidation tooling comprises a pressure-exerting member 403 which is configured to receive the body member 409 of the housing 303 of the waveguide assembly and exert a downward pressure onto the flange member 311 of the housing 303, such as to exert a compressive force onto the layers of the panel which are located above the flange member 311 of the housing 303, as will be described in more detail hereinbelow.

The pressure-exerting member 403 comprises an annular element 407 which presents a lower pressure-exerting surface 409 and has a central aperture 411, in this embodiment of circular section which corresponds to the circular section of the body member 409 of the housing 403, such that the inner peripheral edge of the annular element 407 abuts the outer peripheral surface of the body member 409 of the housing 403.

In this embodiment the annular element 407 includes a recess 415 about the inner peripheral edge thereof, and the pressure-exerting member 403 further comprises an annular seal 417, here in the form of an O-ring, which is disposed in the peripheral recess 415 and provides for a hermetic seal between the annular element 407 and the body member 409, such as to prevent the flow of resin up the side of the body member 409.

In this embodiment the annular element 407 has a lateral width which is substantially greater than the lateral width of the flange member 311, in this embodiment a lateral width about twice that of the flange member 311, such that a compressive force is applied to the layers of the panel over a surface beyond the outer peripheral edge of the flange member 411.

In this embodiment the lower, inner peripheral surface of the annular element 407 is profiled such as to have a profile corresponding to that of the flange member 311, such that the annular element 407 provides for the application of a substantially uniform compressive force over the lateral width thereof.

In this embodiment the upper peripheral surface of the annular element 407 is a smooth surface which allows for the bonding of a vacuum bag thereto, typically by an adhesive element.

In an alternative embodiment the vacuum bag could be sealed to the annular element 407 by a sealing gasket, typically a rubber gasket.

In this embodiment the lower peripheral surface of the annular element 407 is grooved, which assists in ensuring the flow of resin into contact with the entire peripheral surface and provides a key for the bond with the resin.

The consolidation tooling of this embodiment is a sacrificial component, insofar as the tooling is bonded to the panel following curing of the panel. In being a sacrificial component, the consolidation tooling of the present invention allows for the waveguide assembly to have components which extend over the tooling and would prevent the removal of the tooling.

In one embodiment the annular element 407 can be configured to confer additional mechanical strength to the embedded waveguide assembly, in effect anchoring the waveguide assembly to the surface of the panel.

In one embodiment the annular element 407 can be formed of the same material as the housing 303.

In one embodiment a film of a resin or bonding agent can be located beneath the annular element 407, such as to improve the bonding of the consolidation tooling to the panel.

Figure 17:
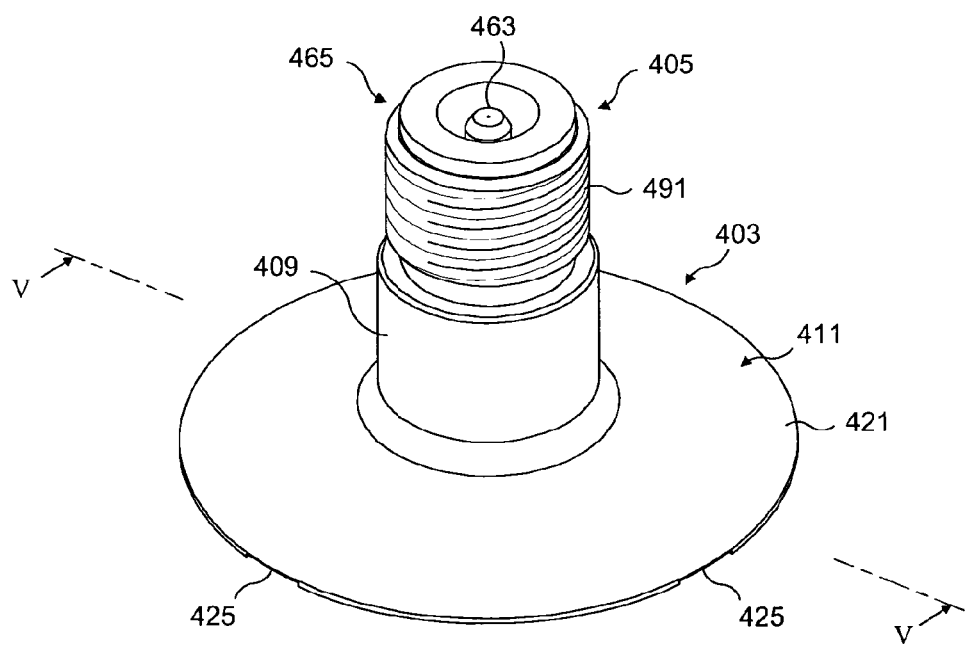
FIG. 17 illustrates a perspective view of a waveguide assembly in accordance with a third embodiment of the present invention.
Figure 18:
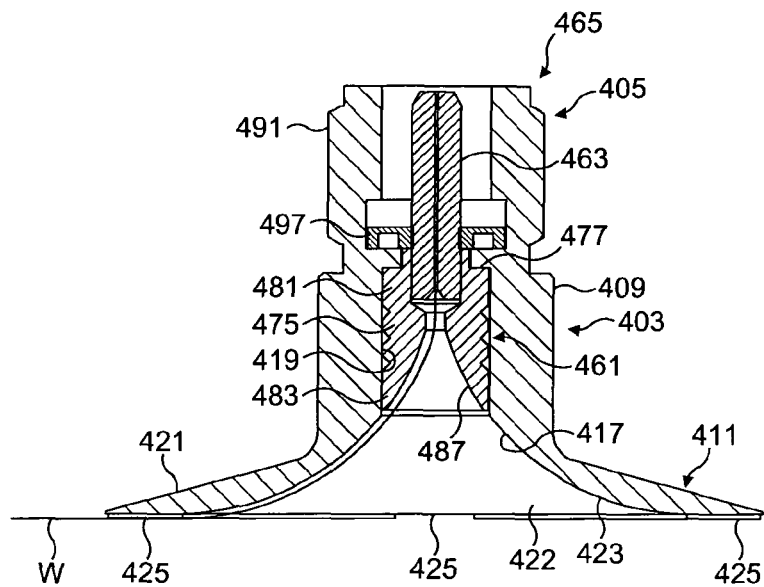
FIG. 18 illustrates a vertical sectional view (along section V-V in FIG. 17) of the waveguide assembly of FIG. 17.
Figure 19:
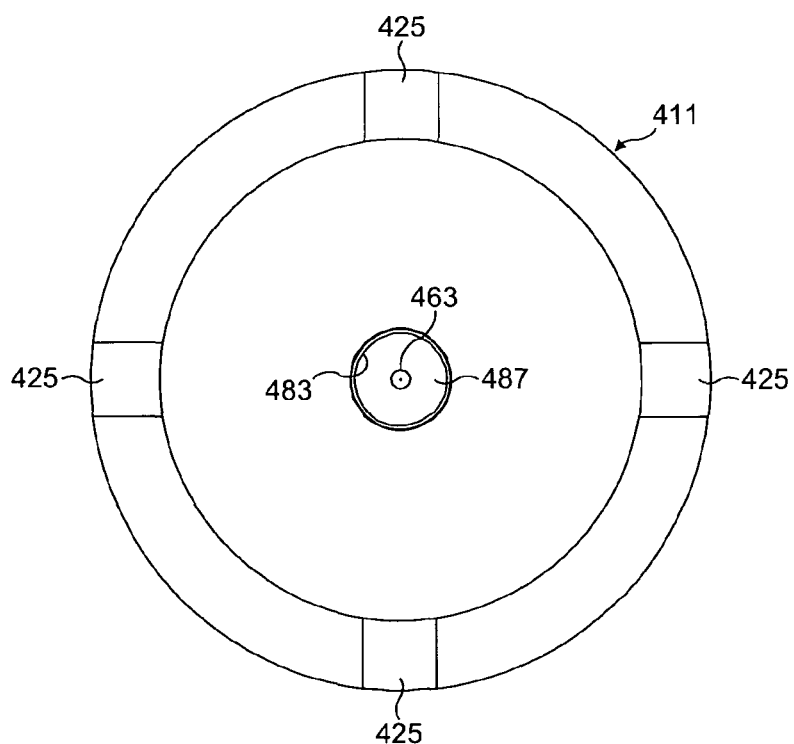
FIG. 19 illustrates an underneath plan view of the waveguide assembly of FIG. 17.

FIGS. 17 to 19 illustrate a waveguide assembly in accordance with a third embodiment of the present invention.

The waveguide assembly comprises a housing 403 which is mounted to a substrate, such as a composite panel formed of a plurality of layers or plies, in this embodiment by embedding a part of the housing 403 in the substrate, and a connector unit 405 which is attached to the housing 403 and provides for connection to an external component.

The housing 403 comprises a body member 409 and a flange member 411, which extends about a lower peripheral edge of the body member 409, such as to define a structure which in this embodiment is embedded between layers of the panel to which the waveguide assembly is mounted.

In this embodiment the body member 409 comprises an upstanding member which has a cylindrical outer section, here a circular section. In having a circular section, the layers of the panel to which the waveguide assembly is to be mounted only require the cutting of a circular aperture, which is relatively easily done as compared to other asymmetric shapes. In addition, the circular section facilitates sealing with the consolidation tooling which is used to mount the waveguide assembly.

The body member 409 includes a connector recess 417 which extends between the lower and upper ends thereof, which supports a connector body 461 of the connector unit 405.

In this embodiment the connector recess 417 comprises a substantially cylindrical channel 419, here a substantially circular channel, which opens to the lower end of the body member 409, such as to allow the connector body 461 of the connector unit 405 to be slid thereinto. This configuration again advantageously allows for the pre-termination of the waveguide W, insofar as the fitting of the connector body 461 to the body member 409 can be performed subsequent to the termination of the waveguide W.

The flange member 411 has a relatively-thin section which has a tapered upper surface 421, such as to present a structure which provides a limited disruption to the layers of the panel to which the waveguide assembly is mounted, and includes a waveguide cavity 422 which has an outwardly flared surface 423 which defines a guide path, here defining a predetermined bend radius, which is such as to prevent damage to the waveguide W.

The flange member 411 includes at least one, in this embodiment a plurality of waveguide recesses 425 in the lower surface thereof which provide for passage of the waveguide W from the waveguide cavity 422 into the plane of the layers of the panel.

The connector unit 405 comprises a connector body 461 which is disposed in the connector recess 417 in the body member 409, a ferrule 463, in this embodiment an optical ferrule, here a ceramic ferrule, which is coupled to the waveguide W and fixed to the connector body 461, and a connector element 465, which is disposed about the ferrule 463 and fixed to the body member 409, in this embodiment the upper end of the body member 409.

The connector body 461 comprises a main body part 475, in this embodiment a cylindrical body, here a circular body, which is disposed in the connector recess 417 in the body member 409, and a flange element 477 at an upper end of the body part 475 which acts as a detent which locates the connector body 461 at a predetermined position within the connector recess 417. In this embodiment the body part 475 is configured to be a close sliding fit in the connector recess 417, such that the connector body 461 is precisely located to the housing 403.

The connector body 461 further comprises a coupling part 481, in this embodiment a cylindrical part, which extends forwardly of the body part 475 and to which the ferrule 463 is fitted.

The connector body 461 further comprises a support part 483, in this embodiment a cylindrical section, which extends rearwardly of the body part 475 and has an inner surface 487 which flares outwardly to the rear end thereof, and defines a bend radius, which, together with the bend radius as defined by the inner surface 423 of the flange member 411, restricts the extent of the bending of the waveguide W, such as to prevent damage to the same.

The connector element 465 comprises a shell coupling 491, in this embodiment comprising a substantially cylindrical section, which surrounds the ferrule 463 and is fixed to the body member 409, and a sealing member 497, in this embodiment an annular seal, which is disposed within the shell coupling 491 about the ferrule 463, at the bottom, lower end of the shell coupling 491.

In this embodiment the shell coupling 491 is integrally formed with the body member 409, which integral structure can be formed of a metal or plastics material.

As described hereinabove, the waveguide assembly of this embodiment advantageously allows for the pre-termination of the waveguide W.

In addition, the housing 403 advantageously allows for manufacture by turning operations as opposed to milling operations, which are more complicated and hence more costly.

The mounting of the waveguide assembly in a panel can be performed using the consolidation tooling of the kind as described hereinabove.

In one embodiment the waveguide assembly can further comprise a male insert element (not illustrated), having a counterpart shape to the waveguide cavity 422, which is located in the waveguide cavity 422 in order to reduce the amount of potting required.

Finally, it will be understood that the present invention has been described in its preferred embodiments and can be modified in many different ways without departing from the scope of the invention as defined by the appended claims.

For example, in one modification, the waveguide W could be a metallic wire instead of an optical fiber. The present invention has application in interfacing any kind of embedded elements.

The invention claimed is:

1. An assembly for interfacing an embedded element, in particular a waveguide, at a surface of a substrate, the assembly comprising:
 a housing which is mounted to the substrate, wherein the housing includes a lower, mounting face which is disposed to the surface of the substrate, and a connector recess which opens to the mounting face; and
 a connector unit which comprises a connector assembly comprising a ferrule to which the embedded element is terminated and a connector body to which the ferrule is attached, wherein the connector assembly is fitted in the connector recess;
 wherein the connector recess includes a cavity which opens to the mounting face of the housing and allows for passage of the connector assembly when pre-terminated on the embedded element into the connector recess through the cavity from the mounting face of the housing, thereby providing for fitting of the housing to the connector assembly subsequent to termination of the embedded element.

2. The assembly of claim 1, wherein the connector body and the connector recess include inter-engaging features which act to position the connector assembly at a predetermined position in the housing.

3. The assembly of claim 1, wherein the connector recess includes a cylindrical channel and the connector body includes a cylindrical body part which is a sliding fit in the cylindrical channel of the connector recess, optionally the connector recess further includes a cavity which extends from the cylindrical channel and opens to the mounting face of the housing, optionally the connector body further includes a coupling part which extends forwardly of the body part and to which the ferrule is attached, optionally the connector body further comprises a support part which extends rearwardly of the body part and includes a guide path which defines a bend radius for the passage of the embedded element.

4. The assembly of claim 1, wherein the connector unit further comprises a connector element which is disposed about the ferrule and attached to the housing, optionally the connector element includes a shell coupling which surrounds the ferrule, optionally the shell coupling comprises a substantially cylindrical section, optionally the housing includes a contact face and the shell coupling is attached to the contact face, optionally the connector element further includes an attachment member which extends from the shell coupling and is fixed to the contact face, optionally the connector unit comprises a single fixing element by which the attachment member is fixed to the contact face, optionally the contact face is inclined to face upwardly relative to the mounting face or extends substantially perpendicular relative to the mounting face, optionally the shell coupling is integrally formed with the housing, optionally the shell coupling has a connection axis which extends upwardly substantially perpendicular relative to the mounting face.

5. The assembly of claim 1, wherein the housing comprises a body member and a flange member which extends about a lower peripheral edge of the body member, optionally the body member comprises an upstanding member which has an elongate lateral section or a circular lateral section.

6. The assembly of claim 1, wherein the mounting face includes at least one channel for receiving the embedded element which is embedded in the substrate, optionally the channel has a width which accommodates a tow formed on the embedded element, optionally the mounting face includes a plurality of channels.

7. Consolidation tooling for mounting an assembly to a surface of a substrate comprising a plurality of layers, wherein the assembly comprises a housing which comprises a body member and a flange member which extends about a lower peripheral edge of the body member, and a connector unit which is disposed to the housing and comprises a connector assembly which comprises a ferrule to which an embedded element, in particular a waveguide, is terminated and a connector body to which the ferrule is attached, wherein the consolidation tooling comprises a pressure-exerting member which is configured to receive the body member of the housing and provide for transmission of a downward pressure onto the flange member of the housing, which is such as to exert a compressive force onto the layers of the substrate which are located above the flange member, and the consolidation tooling is a sacrificial component, which remains bonded to the substrate following mounting of the assembly.

8. The tooling of claim 7, wherein the pressure-exerting member comprises an annular element which presents a lower, pressure-exerting surface and has an aperture which corresponds to the lateral section of the body member, such that the inner peripheral edge of the annular element abuts the outer peripheral surface of the body member, optionally the aperture has an elongate section or a circular section, optionally the annular element includes a peripheral recess about the inner peripheral edge thereof, and the pressure-exerting member further includes an annular seal which is disposed in the peripheral recess and provides for a seal between the annular element and the body member, optionally the annular element has a lateral width which is greater than the lateral width of the flange member, such that a compressive force is applied to the layers of the substrate beyond the outer peripheral edge of the flange member, optionally the pressure-exerting surface of the annular element has a profile corresponding to that of the flange member, such that the annular element provides for application of a substantially uniform compressive force over the lateral width thereof.

9. The tooling of claim 7, wherein the pressure-exerting member is formed of the same material as the housing.

10. A method of mounting an assembly to a surface of a substrate, the method comprising the steps of:
 providing a connector assembly comprising a ferrule and a connector body to which the ferrule is attached;
 pre-terminating the connector assembly to an embedded or embeddable element, in particular a waveguide;
 providing a housing which includes a lower, mounting face and a connector recess which opens to the mounting face;
 inserting the pre-terminated connector assembly into the connector recess in the housing;
 locating the mounting face of the housing on the substrate; and
 fabricating the substrate, during which fabrication the housing is bonded to the substrate.

11. The method of claim 10, wherein the step of pre-terminating the connector assembly comprises the steps of:

fitting the connector body to the embedded element;
terminating the embedded element to the ferrule; and
attaching the ferrule to the connector body.

12. The method of claim 10, wherein the connector body and the connector recess include inter-engaging features which act to position the connector assembly at a predetermined position in the housing.

13. The method of claim 10, wherein the connector recess includes a cylindrical channel and the connector body includes a cylindrical body part which is a sliding fit in the cylindrical channel of the connector recess, optionally the connector body further includes a coupling part which extends forwardly of the body part and to which the ferrule is attached, optionally the connector body further includes a support part which extends rearwardly of the body part and includes a guide path which defines a bend radius for the passage of the embedded element.

14. The method of claim 10, wherein the housing includes a shell coupling, optionally the shell coupling is integrally formed with the housing, optionally the shell coupling has a connection axis which extends upwardly substantially perpendicular relative to the mounting face.

15. The method of claim 10, further comprising the steps of:
providing a connector element which includes a shell coupling; and
fixing the connector element to a contact face of the housing, such that the shell coupling is disposed about the ferrule, optionally the shell coupling comprises a substantially cylindrical section, optionally connector element is fixed to the housing by a single fixing element, optionally the contact face is inclined, such as to face upwardly relative to the mounting face or extends substantially perpendicular relative to the mounting face, optionally the housing comprises a body member and a flange member which extends about a lower peripheral edge of the body member and defines the mounting face, optionally the body member comprises an upstanding member which has an elongate lateral section or a circular lateral section, optionally the contact face is recessed, such that the connector element does not extend laterally beyond the circular section.

16. The method of claim 10, wherein the housing comprises a body member and a flange member which extends about a lower peripheral edge of the body member and defines the mounting face, optionally the body member comprises an upstanding member which has an elongate lateral section or a circular lateral section.

17. The method of claim 10, wherein the mounting face includes at least one channel for receiving the embedded element which is embedded in the substrate, optionally the channel has a width which accommodates a tow formed on the embedded element, optionally the mounting face includes a plurality of channels.

18. The method of claim 10, wherein the housing comprises a locator which guides the embedded element to the connector unit, optionally the locator includes a guide path which defines a bend radius for the embedded element, optionally the locator is configured to re-direct the embedded element through an angle of about 180 degrees from a first direction to a second direction, opposite the first direction, which is substantially parallel, but vertically spaced from the mounting face of the housing, optionally the locator is an insert which is removably mounted within the body member, and the step of inserting the pre-terminated connector assembly into the connector recess in the housing comprises the steps of:
removing the locator from the body member;
locating the connector assembly in the connector recess in the housing; and
inserting the locator into the body member;
optionally the housing further comprises a support member which includes the connector recess and is removably mounted to the body member, and the step of inserting the pre-terminated connector assembly into the connector recess in the housing comprises the steps of:
removing the support member from the body member;
locating the connector assembly in the connector recess; and
fitting the support member to the body member;
optionally the connector recess includes a through slot along the length thereof, such as to allow for the embedded element to be located therein.

19. The method of claim 18, wherein the step of locating the mounting face of the housing on the substrate comprises the step of:
locating the flange member between the layers of the panel, where one or more of the layers include an aperture which has the same shape as the lateral section of the body member, such that the body member extends through the layers;
optionally the step of bonding the housing to the substrate comprises the step of:
locating consolidation tooling over the body member of the housing, wherein the consolidation tooling comprises a pressure-exerting member which receives the body member of the housing and a biasing unit which is attached to the housing and exerts a downward pressure onto the flange member of the housing, such as to exert a compressive force onto the layers of the substrate which are located above the flange member, optionally the pressure-exerting member comprises an annular element which presents a lower, pressure-exerting surface and has an aperture which corresponds to the section of the body member, such that the inner peripheral edge of the annular element abuts the outer peripheral surface of the body member of the housing, optionally the aperture has an elongate section or a circular section, optionally the annular element includes a peripheral recess about the inner peripheral edge thereof, and the pressure-exerting member further comprises an annular seal which is disposed in the peripheral recess and provides for a seal between the annular element and the body member, optionally the annular element has a lateral width which is greater than the lateral width of the flange member, such that a compressive force is applied to the layers of the substrate beyond the outer peripheral edge of the flange member, optionally the pressure-exerting surface of the annular element has a profile corresponding to that of the flange member, such that the annular element provides for application of a substantially uniform compressive force over the lateral width thereof, optionally the annular element comprises a lower annular part and an upper annular part, optionally the lower annular part is separable from the upper annular part, optionally the lower annular part is a sacrificial part, which remains bonded to the substrate following mounting of the assembly, optionally the lower annular part is formed of the same material as the housing.

20. The method of claim 19, wherein the pressure-exerting member further comprises a coupling element which couples the annular element thereof to the biasing unit, such as to transmit the biasing force of the biasing unit to the annular element, optionally the coupling element comprises an inverted U-shaped element which extends over the body member of the housing and includes an upper bridge section against which the biasing unit is biased, optionally the biasing unit comprises a fixing element which is fixed to the body member of the housing and a biasing element which is configured to apply a biasing force between the fixing element and the bridge section of the coupling element, such as to apply a downward force onto the bridge section of the coupling element and hence the annular element.

21. The method of claim 19, wherein the step of bonding the housing to the substrate comprises the step of:
locating consolidation tooling over the body member of the housing, wherein the consolidation tooling comprises a pressure-exerting member which is configured to receive the body member of the housing;
applying a downward pressure onto consolidation tooling, such as to apply a downward pressure onto the flange member of the housing, which is such as to exert a compressive force onto the layers of the substrate which are located above the flange member; and
retaining the consolidation tooling as a sacrificial component which is bonded to the substrate;
optionally the pressure-exerting member comprises an annular element which presents a lower, pressure-exerting surface and has an aperture which corresponds to the lateral section of the body member, such that the inner peripheral edge of the annular element abuts the outer peripheral surface of the body member, optionally the aperture has an elongate section or a circular section, optionally the annular element includes a peripheral recess about the inner peripheral edge thereof, and the pressure-exerting member further includes an annular seal which is disposed in the peripheral recess and provides for a seal between the annular element and the body member, optionally the annular element has a lateral width which is greater than the lateral width of the flange member, such that a compressive force is applied to the layers of the substrate beyond the outer peripheral edge of the flange member, optionally the pressure-exerting surface of the annular element has a profile corresponding to that of the flange member, such that the annular element provides for application of a substantially uniform compressive force over the lateral width thereof, optionally the pressure-exerting member is formed of the same material as the housing.

22. The method of claim 10, further comprising the steps of:
attaching a monitoring unit to the connector assembly; and
monitoring characteristics of the embedded element during fabrication of the substrate.

23. An assembly for interfacing an embedded element, in particular a waveguide, at a surface of a substrate, the assembly comprising:
a housing which is mounted to the substrate wherein the housing includes a lower, mounting face which is disposed to the surface of the substrate, and a connector recess which opens to the mounting face; and
a connector unit which comprises a connector assembly comprising a ferrule to which the embedded element is terminated and a connector body to which the ferrule is attached, wherein the connector assembly is fitted in the connector recess;
wherein the housing comprises a locator which guides the embedded element to the connector unit, optionally the locator includes a guide path which defines a bend radius for the embedded element, and the connector recess is configured to receive the connector assembly when pre-terminated on the embedded element and provide for fitting of the housing to the connector assembly subsequent to termination of the embedded element.

24. The assembly of claim 23, wherein the locator includes a guide path which defines a bend radius for the embedded element, optionally the locator is configured to re-direct the embedded element through an angle of about 180 degrees from a first direction to a second direction, opposite the first direction, which is substantially parallel, but vertically spaced from the mounting face of the housing, optionally the locator is an insert which is removably mounted within the body member, optionally the housing further comprises a support member which includes the connector recess and is removably mounted to the body member, optionally the connector recess includes a through slot along the length thereof, such as to allow for the embedded element to be located therein.

* * * * *

UNITED STATES PATENT AND TRADEMARK OFFICE
CERTIFICATE OF CORRECTION

PATENT NO. : 8,641,294 B2  Page 1 of 1
APPLICATION NO. : 12/513060
DATED : February 4, 2014
INVENTOR(S) : Gareth L. Bannister It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this
Twenty-second Day of September, 2015

Michelle K. Lee
*Director of the United States Patent and Trademark Office*